3,207,633
PRIMARY ALKALINE CELL

Theodore H. Meltzer, Yardley, and Thomas R. Krebs, Huntingdon Valley, Pa., assignors to The Electric Storage Battery Company, a corporation of New Jersey
Filed July 18, 1962, Ser. No. 210,675
3 Claims. (Cl. 136—83)

The present invention generally relates to the field of electric batteries, and more particularly to new and improved electrodes for alkaline batteries.

The efficiency of the electrode reactions involved in the operation of an electric battery depends largely upon the area of the electrode surface available to take place in the reactions. Thus it is, that high electrode capacity and the ability of an electrode to be dischargeable at high rates generally requires that the highest practical amount of the electrode surface be made accessible to the battery electrolyte. While the disposition of a finite amount of electrode material into a configuration having the greatest possible surface area is desirable, inter-particle contact of the electrode material must be maintained or the relatively poor ionic conductivity of the electrolyte is substituted for the better electronic conduction of contiguous electrode material particles, thereby increasing the internal resistance of the electrode.

It is therefore, a specific object of the present invention to provide a new and improved battery electrode in which the active material particles are disposed in such a manner as to provide the highest possible surface area while maintaining the inter-particle contact necessary to provide low internal resistance.

While not limited thereto, the present invention is particularly adapted for use in alkaline primary batteries of the type having a zinc anode. Conventional alkaline primary cell construction utilizes a zinc anode, a cathode of a depolarizer material including an electrolytically reducible oxygen yielding compound and an alkaline electrolyte such as an aqueous solution of an alkali metal hydroxide immobilized against free flow by means of a compatible gel. In U.S. Patent 2,593,893, issued April 22, 1952 to Bernard H. King, there is disclosed a primary cell construction utilizing a composite anode and electrolyte member consisting of a substantially solid self-supporting body composed throughout of a uniform mixture of anode metal particles, the electrolyte, and a compatible gelling agent. The particular gelling agent disclosed in the patent to King is sodium carboxy methyl cellulose, the conductivity of which is considerably enhanced by the entrapped electrolyte. Despite this enhanced conductivity, however, this anode member suffers from the impaired ion mobility inherent in gelled electrolytes, especially at low temperatures.

It is another object of the present invention to provide a new and improved composite electrode-electrolyte configuration in which the electrode particles are suspended in an electrolyte solution which is not gelled and is not characterized by a high viscosity.

It is still a further object of the present invention to provide a new and improved composite electrode-electrolyte configuration which is characterized by high capacity and the ability to be discharged at high rates.

It is another further object of the present invention to provide a new and improved composite electrode-electrolyte configuration which exhibits improved low temperature performance.

In accordance with the present invention, electrode material in the form of finely divided particles are suspended in an electrolyte solution which is not a gel nor of a high viscosity, by the use of polymeric agents whose presence keeps these particles permanently dispersed therein without compromising the ionic mobility of the electrolyte. The polymeric agents which are suitable for practicing the present invention are those which impart to aqueous solutions of alkaline electrolytes the property of plastic flow as defined by a minimum yield value measured by means of a Brookfield Viscometer. In these measurements it is found that such materials are not characterized by the direct relationship of spindle speed to dial rating which exemplifies the Newtonian behavior of flow proportional to shearing stress. By contrast, materials exhibiting plastic flow characteristics flow only after the applied shearing stress exceeds a critical minimum yield value. Among the natural and synthetic hydrophilic polymers which impart to aqueous solutions of alkaline electrolyte the critical minimum yield value necessary to suspend electrode particles are soluble carboxylated copolymers such as polyacrylic acids, polymethacrylic acids, styrene maleic acid copolymers, ethylene maleic acid copolymers, vinyl ester copolymers with maleic acid, vinyl ester copolymers with crotonic acid, vinyl ether copolymers with maleic acid and vinyl ether copolymers with crotonic acid.

By suspension as used herein is meant a physical system characterized by a tendency toward the distribution of electrode particles within the electrolyte in deference to the action of gravity which in the absence of a suspending agent would cause the particles to form a dense compacted layer at the bottom of the liquid. While homogeneity of distribution of electrode particles within the electrolyte is not a necessary consequence of suspensions in accordance with the present invention, the existence of discrete electrode particles unagglomerated by the action of gravity inevitably follows. Accordingly, it is possible to have a broad layer of electrode particles dispersed from one another within the electrolyte which layer may be bounded above, in the presence of excess electrolyte, by a layer of supernatant electrolyte relatively free of electrode particles.

A better understanding of the present invention may be had from the following description when read with reference to the accompanying drawings of which:

Figure 1:
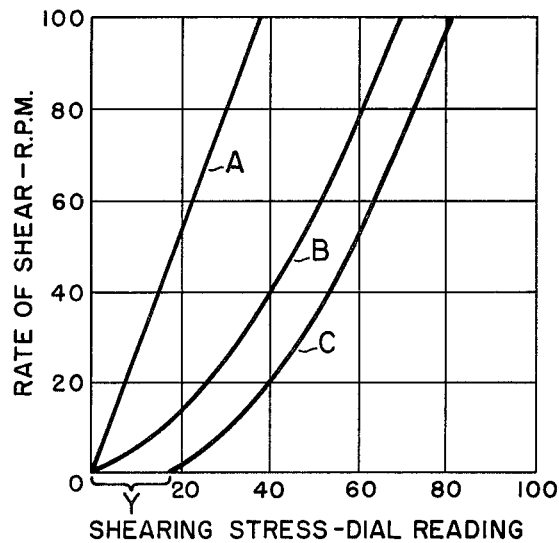
FIG. 1 is a graph illustrating liquid flow characteristics using a Brookfield Viscometer rate of shear, in r.p.m. plotted on the ordinate and shearing stress plotted on the abscissa.

In considering the present invention an understanding of the concept of the yield value is believed to be essential. Referring now to FIG. 1, there is illustrated a graph showing flow characteristics plotted using a Brookfield Viscometer. The Brookfield Viscometer is a rotational instrument which measures the torque required to revolve a spindle through a sample at a given rate of speed. The Brookfield LVT instrument has a range of spindle speeds from 0.3 to 60 r.p.m. An increase in r.p.m. produces a corresponding increase in rate of shear. The torque at any constant spindle speed is indicated by a dial reading of from 0 to 100 and is a measure of shearing stress. The curve A represents a Newtonian liquid which is characterized by a flow which is directly proportional to the shearing force and accordingly, this type of flow can be represented as a straight line passing through the origin. Most pure liquids or solutions of low molecular weight exhibit Newtonian flow properties. Almost all hydrophilic polymer solutions are characterized by a pseudoplastic flow represented by curve B. These materials flow more readily as the rate of shear is increased and hence, produce a flow curve convex to the shearing axis and which also passes through the origin. Materials exhibiting Newtonian flow and pseudoplastic flow can be contrasted to materials exhibiting plastic flow characteristics, curve C, which flow only after the applied shearing stress is designated as yield value, Y, and is measured as the intercept on the stress axis. In accordance with the present invention those materials which impart plastic flow to aqueous solutions of alkaline electrolytes as characterized by the property of yield value are suitable for use as suspending agents for electrode particles in alkaline electrolytes.

Figure 2:
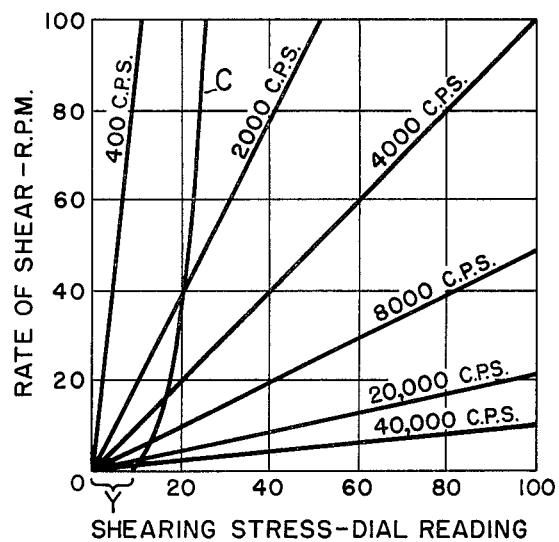
FIG. 2 is a graph of the type of FIG. 1 in which a typical plastic flow curve has been superimposed upon a series of Newtonian flow curves.

The apparent viscosity of a liquid can be calculated for any shear range and is proportional to the slope of the flow curve in that area of shear. Referring now to FIG. 2 in which a typical plastic flow curve C has been superimposed upon a series of Newtonian flow curves, it can be seen that the apparent viscosity of a Newtonian liquid can be measured with a single r.p.m. determination. At 40 r.p.m., however, the viscosity of the plastic sample is represented in terms of Newtonian fluid with a viscosity of 2,000 cps. and at 5 r.p.m. the viscosity is represented in terms of a Newtonian fluid with a viscosity of 8,000 cps. It will be noted that the plastic flow curve C is characterized by a rapidly increasing apparent viscosity as the rotation of the viscometer spindle is decreased. Although the absolute shear stress at 0 r.p.m. cannot be measured, extrapolation of the curve to 0 r.p.m. results in an estimated yield value which has proven to be reliable for the purposes of the present invention. This estimated yield value, $$Y = \frac{\text{(Apparent viscosity at 0.3 r.p.m.} - \text{apparent viscosity at 0.6 r.p.m.)}}{100}$$

and is measured by a Brookfield LVT Viscometer using a #1 spindle.

In accordance with the present invention it has been found that polymeric suspending agents which impart to aqueous solutions of alkaline electrolytes the property of plastic flow as defined by a minimum estimated yield value of 9.0 as calculated by the formula noted above, are operative to form a permanent suspension of finely divided or powdered electrode active materials in liquid alkaline electrolyte solutions. Still further, it has been found that in dilute solutions of these polymeric materials or suspending agents small concentration changes produce large effects on the solution yield value with very little change in the viscosity of the solution. It is therefore possible to obtain a lesser or greater yield value with essentially no viscosity change in these dilute regions. At high concentrations, the yield value increases less rapidly with changes in concentration. As a result, it is possible with dilute solutions of these suspending agents in alkaline electrolytes to select almost any concentration and, hence, achieve almost any viscosity without sacrificing the required minimum yield value specified hereinbefore. For the purposes of the present invention it is preferred to utilize a dilute solution of low viscosity in order to achieve the highest possible ion mobility and, hence, improved electrode characteristics. It should be understood, that in accordance with the present invention the concentration of these suspending agents is maintained such that electrolyte containing the dissolved suspending agents remains at all times a liquid and does not approach a gelled state.

Figure 3:
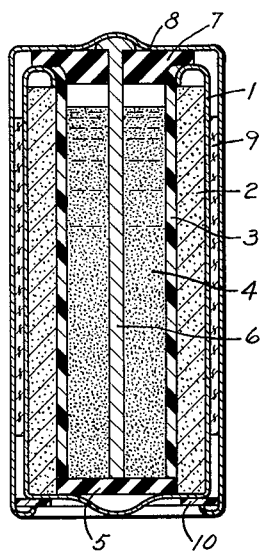
FIG. 3 is a sectional view of a primary cell utilizing an electrode-electrolyte construction in accordance with the present invention.

Referring now to FIG. 3 there is shown a sectional view of a primary cell utilizing a composite electrode-electrolyte member as its anode. Numeral 1 designates an inner cell container of steel or other suitable metal having a cylindrical annulus 2 of a depolarizer material comprising an oxygen yielding compound such as mercuric oxide on its inner surface. A cylindrical separator 3 of microporous plastic or other ion permeable material separates the positive electrode 2 from the anode or negative electrode 4 which, in accordance with the present invention, comprises a body of electrolyte having permanently suspended therein finely divided particles of amalgamated zinc. The anode 4 is insulated from the bottom of the container 1 by means of a plug 5 of rubber or other suitable insulating material. Electrical contact with the anode 4 is made by means of an axial conductor 6 which extends centrally through the electrode-electrolyte body. As shown, the conductor 6 passes through an insulating plug 7 and is in electrical contact with the outer cell container 8. The outer container 8 and the inner container 1 are electrically insulated from each other by means of a tube 9 of paper or other similar material and by means of a plastic washer 10 at the bottom of the cell.

In the assembly of a cell such as is shown in FIG. 3 the separator tube may be inserted into the inner container 1 after the positive active material has been extruded therein. The electrolyte, containing a suitable suspending agent, is then poured into the center area defined by the separator 3 and plug 5. The anode material in powdered form is then added to the electrolyte-suspending agent mixture to substantially fill the central area of the cell. The paper insulator tube is then fitted around the inner container 1 and the plug 7, with the conductor 6 therein, is fitted into the mouth of the separator tube. Next, the outer can is fitted over the entire assembly and its edge curled over against the insulator 10 to unify the assembly. This operation causes the plug 7 to flare the separator tube 3 against the inner can 1, sealing the cell from leakage and establishes good electrical contact between the conductor 6 and the outer container 8.

An electrode-electrolyte composition in accordance with the present invention may be prepared in a number of ways. Most conveniently, the suspending agent is added directly to an aqueous solution of an alkaline electrolyte of the desired concentration which conventionally may comprise a 20% to 40% solution of an alkaline metal hydroxide. An aqueous solution of the suspending agent may also be prepared and that may be added to the electrolyte in an amount which will provide the concentration necessary to impart to the electrolyte the desired yield value. As noted hereinbefore, the concentration of the suspending agent in the electrolyte must be such as to impart to the electrolyte a minimum estimated yield value of at least 9, but not in such concentrations as to cause a gelling thereof. In this respect it should be noted, that it is generally desirable to maintain the viscosity of the electrolyte as low as possible in order to retain maximum ion mobility. As will be understood by those skilled in the art, the concentration of the suspending agent which is necessary to impart to an electrolyte the required minimum yield value will vary with the specific suspending agent utilized. However, this may be readily ascertained by means of the Brookfield Viscometer measurements described hereinbefore. The following soluble carboxylated polymers and copolymers have been found suitable for imparting to alkaline electrolytes the plastic flow characteristics required for suspending finely divided electrode particles; polyacrylic acids, polymethacrylic acid, styrene maleic acid copolymers, ethylene maleic acid copolymers, vinyl ester copolymers with maleic acid, vinyl ester copolymers with crotonic acid, vinyl ether copolymers with maleic acid and vinyl ether copolymers with crotonic acid. Following the mixing of the suspending agent and the electrolyte, the finely divided electrode active material particles may be added to the electrolyte and mixed therewith prior to the introduction of the mixture into the cell or the electrolyte may be added to the cell and the electrode material added in situ.

By way of illustration of a specific electrolyte solution for utilization in a primary cell of the type shown in FIG. 3, 31 grams of potassium hydroxide, 6.9 grams zinc oxide, and 0.52 grams of polycarboxylic acid were dissolved in 69 grams of water. In accordance with conventional practice, the zinc oxide was added to the electrolyte to inhibit the solution of the zinc electrode particles therein. This solution exhibited plastic flow characteristics and was characterized by a yield value of 14.5 calculated in accordance with the method described hereinbefore and produced an excellent suspension of finely divided amalgamated zinc. Wide variations are possible in the type and size of zinc powders utilized and in the amount of amalgamation used. For test purposes, excellent results have been obtained with zinc powder having a particle size such that substantially all of it will pass through a 60-mesh screen and be retained on a 100-mesh screen. Good results have also been obtained where this zinc has been amalgamated with 14% by weight of mercury.

Cells made in accordance with the construction shown in FIG. 3 and utilizing zinc of the type described above have exhibited both improved high rate and improved low temperature discharge capabilities. This improved performance can be attributed to the novel suspension of the zinc anode material in the liquid electrolyte as was demonstrated in tests made with two groups of size "AA" primary cells which were identical in every respect except as to their anode constructions. The positive electrode of each of the test cells was mercuric oxide and the separator utilized was micro-porous polyethylene. Except as modified in accordance with the present invention by the addition of a suspending agent, the electrolyte utilized comprised 100 milliliters of water, 63.8 grams potassium hydroxide and 10 grams of zinc oxide. The two groups of cells were identified as A and B, and had anodes and electrolytes as shown in the table below.

*Table #1*

Cell group:          Anode-electrolyte

A —
- 4.0 grams of Zn (14% Hg) (powdered).
- 2.5 grams electrolyte.
- 0.014 grams polycarboxylic acid.

B —
- 4.0 grams of Zn (14% Hg) pelletized into cylinders.
- 2.5 grams of electrolyte.

Each group of cells as subjected to a conventional flash discharge test and a discharge continuously through a 4.7 ohm resistance to a cut-off voltage of 0.8 volt. These discharges were conducted at a temperature of 70° F. and all of the cells had an open circuit voltage of 1.35 volts at the start of the test. The average results of these tests which are tabulated in Table #2 below, clearly show the improved performance exhibited by the cells of group A which contained electrode-electrolyte bodies in accordance with the present invention.

*Table #2*

| Cell group | Flash current (amps) | Discharge (hours) |
|---|---|---|
| A | 9.8 | 12 |
| B | 5 | 10 |

The cells of groups A and B were also subjected to a low temperature discharge test. The cells of group B did not exhibit the cut-off voltage after a prolonged exposure to a temperature of −40° F., while the cells of group A provided a 6.5 hour discharge continuously through a 4.7 ohm load to a cut-off voltage of 0.8 volt after the same exposure to that temperature.

To further demonstrate the improved cold temperature performance of electrodes in accordance with the present invention, suspended zinc anodes were substituted for composite gelled anodes of commercially available size "AA" primary cells. The commercial cells had an anode composition and a gel of carboxymethyl cellulose and as near as could be determined, were made in accordance with the teachings of U.S. Patent No. 2,593,893. The test cells had magnesium dioxide cathodes and paper separators. The substituted anodes made in accordance with the present invention contained identical amounts of amalgamated zinc as were present in the gelled anodes of the commercial cells, and the suspending electrolyte utilized was the same as was utilized in the cells of group A described hereinbefore. This test was conducted at −40° F. and the cells were discharged through a resistance of 83⅓ ohms to cut-off voltages shown in Table 3 wherein the results of this test are tabulated. Once again, the cells in accordance with the present invention are identified as the cells of group A.

*Table #3*

| Cell group | Discharge Hours to— | |
|---|---|---|
|  | 1.0 volt | 0.8 volt |
| A | 16.3 | 34.8 |
| Commercial cells | 10.3 | 27.1 |

The results of the tests shown in Table 3 clearly show again the superiority of the liquid suspended anodes in accordance with the present invention.

In considering the present invention, it should be understood that while it is particularly adapted to the suspension of zinc anode particles for primary cells, it is by no means limited to that application. It has been found that the suspension may be made of both positive and negative active materials for all types of electrodes utilized in conventional alkaline battery systems. By way of illustration, and not by way of limitation, the following is a list of some conventional finely divided battery active materials which can be suspended in alkaline electrolytes by means of suspending agents of the disclosed: silver, silver oxides, silver chloride, nickel, nickel hydroxide, mercuric oxide, manganese dioxide, cadmium, cadmium oxides, zinc, zinc oxide, iron, iron oxide, copper, cupric oxide, and cupric chloride. In addition, it should be understood that the present invention is applicable to both primary and secondary cell constructions and that regardless of the application suspended electrode-electrolyte constructions are generally characterized by high electrode efficiencies.

Having described the present invention, that which is claimed as new is:

1. A primary alkaline cell comprising a liquid tight container, an anode-electrolyte member consisting essentially of metallic zinc particles permanently suspended in a free flowing liquid alkaline electrolyte having dissolved therein a suspending agent selected from the group consisting of polyacrylic acids, polymethacrylic acids, styrene-maleic acid copolymers, ethylene-maleic acid copolymers, vinyl ester copolymers with maleic acid, vinyl ester copolymers with crotonic acid, vinyl ether copolymers with maleic acid and vinyl ether copolymers with crotonic acid, said suspending agent being present in sufficient concentration to impart to said electrolyte a minimum yield value of 9 as calculated in accordance with the formula $$\frac{\text{(Apparent viscosity at 0.3 r.p.m.} - \text{apparent viscosity at 0.6 r.p.m.)}}{100}$$

wherein said apparent viscosities are measured with a Brookfield LVT Viscometer using a #1 spindle, a depolarizer-cathode member comprising an oxygen-yielding compound, and an ionically permeable, chemically inert barrier element interposed between said anode and cathode members.

2. In a primary alkaline cell, an anode-electrolyte member consisting essentially of metallic zinc particles permanently suspended in a free flowing liquid alkaline electrolyte having dissolved therein a suspending agent selected from the group consisting of polyacrylic acids, polymethacrylic acids, styrene-maleic acid copolymers, ethylene-maleic acid copolymers, vinyl ester copolymers with maleic acid, vinyl ester copolymers with crotonic acid, vinyl ether copolymers with maleic acid and vinyl ether copolymers with crotonic acid, said suspending agent being present in sufficient concentration to impart to said electrolyte a minimum yield value of 9 as calculated in accordance with the formula $$\frac{\text{(Apparent viscosity at 0.3 r.p.m.} - \text{apparent viscosity at 0.6 r.p.m.)}}{100}$$

wherein said apparent viscosities are measured with a Brookfield LVT Viscometer using a #1 spindle.

3. In a primary alkaline cell, an anode-electrolyte member consisting essentially of a finely divided battery active material permanently suspended in a free flowing liquid alkaline electrolyte having dissolved therein a suspending agent selected from the group consisting of polyacrylic acids, polymethacrylic acids, styrene-maleic acid copolymers, ethylene-maleic acid copolymers, vinyl ester copolymers with maleic acid, vinyl ester copolymers with crotonic acid, vinyl ether copolymers with maleic acid and vinyl ether copolymers with crotonic acid, said suspending agent being present in sufficient concentration to impart to said electrolyte a minimum yield value of 9 as calculated in accordance with the formula $$\frac{\text{(Apparent viscosity at 0.3 r.p.m.} - \text{apparent viscosity at 0.6 r.p.m.)}}{100}$$

wherein said apparent viscosities are measured with a Brookfield LVT Viscometer using a #1 spindle.

References Cited by the Examiner
UNITED STATES PATENTS

| | | | |
|---|---|---|---|
| 2,593,893 | 4/52 | King | 136—107 |
| 2,747,009 | 5/56 | Kirkwood et al. | 136—103 |
| 3,056,849 | 10/62 | Warren et al. | 136—83 |

WINSTON A. DOUGLAS, *Primary Examiner.*

MURRAY TILLMAN, *Examiner.*